United States Patent [19]

Irani et al.

[11] Patent Number: 5,022,467

[45] Date of Patent: * Jun. 11, 1991

[54] POLYMER CONTAINING PENDANT SILYL ETHER GROUPS USEFUL IN ENHANCED OIL RECOVERY USING $CO_2$ FLOODING

[75] Inventors: Cyrus A. Irani, Houston, Tex.; Thomas V. Harris, Benicia, Calif.; Wayne R. Pretzer, Wheaton, Ill.

[73] Assignee: Chevron Research Company, San Francisco, Calif.

[ * ] Notice: The portion of the term of this patent subsequent to Apr. 3, 2007 has been disclaimed.

[21] Appl. No.: 138,268

[22] Filed: Dec. 23, 1987

Related U.S. Application Data

[63] Continuation-in-part of Ser. No. 73,791, Jul. 14, 1987, Pat. No. 4,913,235, which is a continuation-in-part of Ser. No. 58,690, Jun. 3, 1987, abandoned, which is a continuation of Ser. No. 910,041, Sep. 22, 1986, abandoned, which is a continuation of Ser. No. 749,479, Jun. 27, 1985, abandoned.

[51] Int. Cl.$^5$ .............................................. E21B 43/22
[52] U.S. Cl. .................................... 166/273; 166/268; 252/8.554
[58] Field of Search ............... 166/268, 273, 274, 275; 252/8.554

[56] References Cited

U.S. PATENT DOCUMENTS 4,609,043 9/1986 Cullick .............................. 166/268

*Primary Examiner*—George A. Suchfield
*Attorney, Agent, or Firm*—Edward J. Keeling; Ernest A. Schaal

[57] ABSTRACT

A polymer having pendant silyl ether groups is disclosed having a minimum solubility parameter of 6.85 $(cal/cc)^{\frac{1}{2}}$ or less. That minimum solubility parameter is reduced to 6.85 $(cal/cc)^{\frac{1}{2}}$ or less by control of the number of pendant silyl ether groups and by the selection of said silyl ether groups. The polymer can be formed by reacting a olefin monomer with a silyl monomer or by grafting a silyl monomer onto an unsaturated polyolefin. Preferably, the silyl monomer is either a vinyl trimethylsilyl ether monomer, a vinyl dimethylchlorosilane monomer, or a vinyl methyldichlorosilane monomer. Preferably, the olefin monomer is decene, and the unsaturated polyolefin is polydecene.

9 Claims, No Drawings

POLYMER CONTAINING PENDANT SILYL ETHER GROUPS USEFUL IN ENHANCED OIL RECOVERY USING CO₂ FLOODING

CROSS-REFERENCE TO RELATED APPLICATIONS

This application is a continuation-in-part of our application entitled "ENHANCED OIL RECOVERY USING CO₂ FLOODING", filed on July 14, 1987, and assigned U.S. Ser. No. 073,791, now U.S. Pat. No. 4,913,235, which is a continuation-in-part of our application U.S. Ser. No. 058,690, filed on June 3, 1987, now abandoned, which is a continuation of our application U.S. Ser. No. 910,041, filed Sept. 22, 1986, now abandoned, which is a continuation of our application U.S. Ser. No. 749,479, filed on June 27, 1985, now abandoned. All said applications are completely incorporated herein by reference for all purposes.

The present invention relates to a polymer useful in increasing the viscosity of carbon dioxide; to new compositions of matter comprising carbon dioxide and a viscosifying amount of a defined polymer-cosolvent mixture; and to a method of recovering oil from underground subterranean formations.

BACKGROUND OF THE INVENTION

In newly discovered oil fields, oil usually will be recovered by flowing from a producing well under the naturally occurring pressure of the fluids present in the porous reservoir rocks. That naturally occurring pressure decreases as the fluids are removed. This phase of production, called primary production, recovers perhaps 5% to 20% of the oil present in the formation.

Secondary recovery methods (e.g., waterflooding) are used to recover more of the oil. In these methods, a fluid is injected into the reservoir to drive additional oil out of the rocks. Waterflooding has limitations. As the water is immiscible with oil, and as the water displaces the oil, oil remaining in the reservoir reaches a limiting value known as "the residual oil saturation" and oil no longer flows. There is a strong capillary action which tends to hold the oil in the interstices of the rocks. The amount of oil recovered by secondary techniques is usually from about 5% to 30% of the oil initially present.

In recent years, more attention has been directed to enhanced recovery or tertiary recovery techniques. While these methods are more expensive, they are justified by the increased price of crude. In general, these tertiary recovery methods are used to recover the residual oil by overcoming the capillary forces which trap oil during waterflooding. For example, it has been suggested to add surfactants to the flood to decrease the interfacial tension and thus allow oil droplets to move to producing wells.

Secondary or tertiary recovery of oil is also possible by the miscible fluid displacement process. Propane, for example, can be used, for it is fully miscible with oil. But, except in remote regions such as the Arctic, where it is impractical to pipe propane, propane is usually far too expensive to use.

Nevertheless, it is well known to use crude oil miscible solvents, such as propane, to displace crude oil through a formation. For example, see the teachings of Morse in U.S. Pat. No. 3,354,953. Morse suggests that the viscosity of the propane can be increased by the addition of kerosene. Henderson et al. teach in U.S. Pat. No. 3,330,345 the use of a slug of thickened material, such as propane, before flooding with an amphipathic solvent. Dauben et al. teach in U.S. Pat. No. 3,570,601 the recovery of oil using viscous propane, where the propane is viscosified by first dissolving a solid polymer (such as polyisobutylene) in a heavier hydrocarbon (such as heptane) and then diluting this first solution with propane to form the oil-driving bank.

In the continental United States, carbon dioxide is generally less expensive than propane. A number of carbon dioxide floods have been tried in the United States. The carbon dioxide tends to dissolve in the oil which swells with a consequent decrease in viscosity and improvement in the flow to producing wells. The carbon dioxide also extracts light hydrocarbons from the oil and this mixture of carbon dioxide and light hydrocarbons can in some cases reach a composition that will miscibly displace the oil. This carbon dioxide-rich phase characteristically has a lower viscosity than the oil and tends to finger through the formation. Early carbon dioxide breakthrough is undesirable since reservoir sweep is reduced and expensive separation procedures are required to separate and recycle the carbon dioxide. For example, the viscosity of carbon dioxide at usual reservoir pressures and temperatures is on the order of a few hundredths of a centipoise while the oil being displaced may have a viscosity in the range of from 0.1 to 100 centipoises.

An increase in the viscosity of carbon dioxide would be helpful in decreasing the mobility of the carbon dioxide, thus increasing the pressure gradient behind the frontal region which would reduce fingering and improve the reservoir sweep.

The prior art describes a number of techniques to control the mobility of carbon dioxide. These techniques are described generally in an article entitled "CO₂ as Solvent for Oil Recovery" by F. M. Orr, Jr. et al. (Chemtech, August 1983, page 42, et seq.). There is the water-alternating-with-gas process where slugs of carbon dioxide are injected alternatively with slugs of water. Also studied was the use of polyxers to reduce carbon dioxide mobility. The F. M. Orr, Jr. et al. paper describes studies by New Mexico Petroleum Recovery Research Center that indicate that only low-molecular weight polymers dissolve in carbon dioxide and, as a result, only 10% to 20% increase in solution viscosity have been observed.

Other studies of the use of polymers for carbon dioxide thickening appear in "Measuring Solubility of Polymers in Dense CO₂" by J. P. Heller et al. (Polymer Preprint, Vol. 22(2), 1981, New York ACS Meeting) and "Direct Thickeners for Mobility Control of CO₂ Floods" by J. P. Heller et al. (SPE 11789, June 1983). In the latter paper, Heller et al. conclude that the search for polymeric direct thickeners has been "unsuccessful in the purpose by a wide margin." The increase in viscosity observed by Heller et al. was small and in no case greater than 30%.

Recent work by J. P. Heller and J. J. Taber has been reported in "Development of Mobility Control Methods to Improve Oil Recovery by CO₂: Final Report," DOE/MC/10689-17 (available from NTIS) where the authors list some 53 polymers which have been tried in an effort to thicken the carbon dioxide but with little to no success.

Work done by Heller et al. was done with pure dry carbon dioxide at pressure of 1500 to 3160 psig and temperatures of 25° to 58° C. which would be typical of reservoirs where carbon dioxide flooding could be carried out. A number of low and high molecular weight polymers were tried, and in general their results showed that high molecular weight polymers were not soluble. Polymers having solubilities above one weight percent (i.e., polybutene, polydecene and polypropylene glycol) all had molecular weights of 400 to 1000. Increasing molecular weight of the polymer led to decreased solubility of the polymer in carbon dioxide. Heller's work suggests that it is not obvious how to find polymers having a molecular weight over 1000 that have any significant solubility in carbon dioxide. The known poor solvent properties of liquid and supercritical carbon dioxide are a limiting factor when it comes to dissolving large molecules such as high molecular weight polymers.

In our application entitled "ENHANCED OIL RECOVERY USING $CO_2$ FLOODING", filed on July 14, 1987, and assigned U.S. Ser. No. 073,791, we taught a means to increase the viscosity of carbon dioxide to achieve a viscosity of at least 0.15 centipoises utilizing polymers having a molecular weight above 1000. We achieved viscosity increases for the carbon dioxide of three-fold to 30-fold or more utilizing certain defined cosolvents along with certain defined polymers having a minimum solubility parameter of 6.85 $(cal/cc)^{\frac{1}{2}}$ or less and having electron donor groups such as ether, silyl ether, and tertiary amine. Those defined polymers include polysiloxanes and polyvinylethers. Unfortunately, those polymers are expensive.

SUMMARY OF THE INVENTION

The present invention is a polymer containing pendant silyl ether or polydimethylsiloxane groups that has a minimum solubility parameter of 6.85 $(cal/cc)^{\frac{1}{2}}$ or less. This low minimum solubility parameter is achieved by controlling of the number of pendant silyl ether or polydimethylsiloxane groups and by selecting the silyl ether or polydimethylsiloxane groups.

Preferably, the polymer has a molecular weight of over 1000 and is formed by reacting a olefin monomer with a silyl monomer or by grafting a silyl monomer or polymer onto a functionalized polymer. Preferably, the silyl monomer is either a vinyl trimethylsilyl ether monomer, a vinyl dimethylchlorosilane monomer, or a vinyl methyldichlorosilane monomer. Preferably, the olefin monomer is decene. Because of the pendant silyl ether groups, this polymer has a low minimum solubility parameter.

The polymer of the present invention can be used in a method for recovering oil from an underground oil-bearing earth formation penetrated by an injection well and a producing well. In that method, carbon dioxide is injected into the formation to displace oil towards the producing well from which oil is produced to the surface. The viscosity of that carbon dioxide is increased at least three-fold by the presence of a sufficient amount of the polymer and a sufficient amount of a cosolvent to form a solution of the polymer in the carbon dioxide.

DETAILED DESCRIPTION OF THE PREFERRED EMBODIMENTS

In its broadest aspect, the present invention is a polymer containing pendant silyl ether or polydimethylsiloxane groups, wherein the minimum solubility parameter of the polymer is reduced to 6.85 $(cal/cc)^{\frac{1}{2}}$ or less by controlling the number of pendant silyl ether or polydimethylsiloxane groups and by selecting the right silyl ether or polydimethylsiloxane groups. In accordance with the invention, the viscosity of carbon dioxide is increased at least three-fold by admixing with the carbon dioxide a blend of that polymer and a cosolvent for such polymer and carbon dioxide.

In one preferred embodiment of this invention, a blend of the polymer and the cosolvent is prepared to form a first solution. This first solution is then diluted with carbon dioxide to form an oil-driving injectable viscous carbon dioxide fluid which has a viscosity at least three times the viscosity of carbon dioxide at the desired reservoir conditions. The result is an improved sweep during flooding operations because of improved carbon dioxide mobility control, with a consequent reduction of fingering.

Carbon dioxide has been used as an oil recovery agent wherein recovery is improved by taking advantage of the solubility of the carbon dioxide in the oil. The carbon dioxide causes viscosity reduction and swelling of the oil, thereby leading to increased recovery. The viscous carbon dioxide mixtures of this invention can be used in any carbon dioxide flood or drive process, but it is preferred that the formation pressure be sufficient to at least equal the minimum miscibility pressure for the carbon dioxide in the oil. The upper limit of pressure is the fracture pressure of the formation. The precise pressure needed in order to achieve miscibility conditions can be determined by anyone having ordinary skill in the art. Such minimum miscibility pressures are generally on the order of 1100 psig or more.

A typical process in which carbon dioxide is driven through the reservoir by an aqueous fluid is fully described in U.S. Pat. No. 3,065,790 to Holm, which incorporated herein by reference for all purposes Holm et al., in the paper titled "Mechanism of Oil Displacement by Carbon Dioxide," Journal of Petroleum Technology December 1974, pp. 1427-1438, demonstrate the advantage of maintaining carbon dioxide at a pressure above the pressure required for miscible-displacement of the reservoir oil by carbon dioxide. This "miscible-displacement pressure" depends on the hydrocarbon type, formation temperature, and other formation conditions, but is generally between about 1100 and 3000 psi. The studies of Holm et al. demonstrate that no advantage is obtained for maintaining formation pressures higher than just above the miscible-displacement pressure. At the high pressures existing in underground formations, carbon dioxide exists as a dense fluid or liquid rather than as a gas, with the critical temperature of carbon dioxide being about 88° F. That is, carbon dioxide cannot be liquefied at temperatures above about 88° F. regardless of the pressures applied but can be compressed to the state of a dense fluid. However, below 88° F. carbon dioxide exists either as a gas or a liquid depending upon the pressure applied. The typical pressures employed in enhanced oil recovery when carbon dioxide is used are in excess of about 700 psi and the temperatures are below about 250° F. Under these conditions the carbon dioxide exists as a dense fluid, rather than as a gas, and if the reservoir temperature is below about 88° F. the carbon dioxide exists as a liquid.

It is well known that the amount of carbon dioxide injected into the formation will vary for different formations and will be dependent upon total reservoir pore volume, hydrocarbon pore volume, and other unique formation characteristics. In carrying out the process of this invention, a slug of viscous carbon dioxide having a reservoir pore volume of between about 0.001 to about 2.0 can be employed with acceptable results being obtained with from about 0.02 to about 0.35 pore volume slugs. The viscous carbon dioxide dense fluid can be used alone to displace the oil in the formation or, preferably, one or more slugs containing 0.01 to about 1 pore volume of the carbon dioxide dense fluid are driven through the formation by a drive fluid. The drive fluid may be water, brine, carbonated water or gas sufficient in quantity to drive the viscous carbon dioxide through the reservoir from the injection well to a production well.

By the term "injection pressure," we mean the pressure at which the displacement fluids enter the formation, i.e., the pressure at a point in the well bore adjacent to the formation. The pressure at which the viscous carbon dioxide fluid is injected into the well bore is generally greater than the pressure in the formation adjacent the well bore. In general, the injection pressure must be sufficient to obtain miscible displacement of the oil through the formation and out the producing well. In general, the injection pressure is maintained above about 1500 psi and particularly good oil recoveries are obtained when the injection pressure is maintained above about 2000 psi. The upper pressure limit is of course the fracture pressure of the formation. The preferred injection pressure is obviously that which achieves an economic balance between oil recovery and operational expense (See U.S. Pat. No. 4,113,011, which is incorporated herein by reference for all purposes).

CARBON DIOXIDE

The carbon dioxide can come from any suitable source such as those described in "Miscible Displacement" by Fred I. Stalkup, Jr. (Monograph Vol. 8, Henry L. Doherty Series, ISBN NO-89520-319-7, Society of Petroleum Engineers, 1983, Chap. 8, sec. 8.4). The purity of the carbon dioxide is important. Substantially pure carbon dioxide is preferred but water saturated carbon dioxide is acceptable since water (or brine) is usually present in the formation. Usually, the carbon dioxide contains at least 95% carbon dioxide and preferably at least 98% carbon dioxide, the remainder being usually light hydrocarbons. The amount of impurities in the carbon dioxide which can be tolerated is a function of the type of oil to be displaced and the type of displacement operation. For a miscible displacement operation, the carbon dioxide must generally be more pure and as the viscosity of the oil to be displaced increases so should the purity of the carbon dioxide. These factors are discussed in the paper "Correlation of Minimum Miscibility Pressure for Impure Carbon Dioxide Streams" by H. M. Sebastian, R. S. Wenger, and T. A. Renner (SPE/DOE 12648; Paper was presented at the SPE/DOE Fourth Symposium on Enhanced Oil Recovery held in Tulsa, OK, April 15-18, 1984). It is obviously a matter of economics regarding the cost for purification of the carbon dioxide versus the benefits derived from this purification.

MINIMUM SOLUBILITY PARAMETER

The polymers should have a Minimum Solubility Parameter of about 6.85 (cal/cc)$^{\frac{1}{2}}$ or less.

The solubility parameters for many materials have been measured and are reported in various sources such as "Handbook of Solubility Parameters and Other Cohesion Parameters" by A. F. M. Barton, CRC Press, 1983 As noted by Barton, published single values of solubility parameters for polymers are not reliable guides of solubility behavior as they are for normal solvents For polymers, the solubility parameter are best specified as a range of solubility parameter values of known solvents which either dissolve the polymer in question or at least swell (i.e., dissolve in) the polymer in question.

It is desired, of course, to devise a simple predictor test as to which polymers will successfully form a viscous solution with $CO_2$ in the presence of certain defined cosolvents ASTM test method D3132-72, described in the Barton reference, provides a spectrum of solubility parameter values for any given polymer. The ASTM test was modified by using mixtures of n-pentane and perfluorodimethylcyclohexane as the test solutions and adding to a weighed amount of polymer enough of the test solution so that the polymer was 10% by weight of the total mixture. The solubility parameter of the test solution was varied by changing the volume fraction concentration of n-pentane in the test solution. Solubility parameters of mixtures can be calculated by volume fraction averaging of the solubility parameters of the individual components as per the teachings of Barton. The test solution compositions are shown on Table I below.

TABLE I

COMPOSITIONS AND SOLUBILITY PARAMETER OF TEST SOLUTIONS MADE BY MIXING n-PENTANE AND PERFLUORODIMETHYLCYCLOHEXANE

| Pure Component | Volume Percent Pentane | Volume Percent Perfluorodimethyl-cyclohexane | Solubility Parameter[a] |
|---|---|---|---|
| n-pentane | 100 | 0 | 7.09[b] |
| | 90 | 10 | 6.99 |
| | 85 | 15 | 6.94 |
| | 80 | 20 | 6.89 |
| | 75 | 25 | 6.85 |
| | 72 | 28 | 6.81 |
| | 70 | 30 | 6.80 |
| | 50 | 50 | 6.60 |
| | 25 | 75 | 6.36 |
| Perfluorodi-methyl-cyclohexane | 0 | 100 | 6.11[b] |

[a]Calculated by volume fraction averaging of parameters of two pure components except where otherwise noted.
[b]"Handbook of Solubility Parameters and Other Cohesion Parameters," CRC Press, Chapter 8, Table 5.

A series of different polymers were added at the 10 weight percent level to the various n-pentane-perfluorodimethylcyclohexane solutions listed in Table I above in order to determine the lowest value of the solubility parameter of a solution in which the given polymer was soluble. This lowest value solubility parameter is defined herein as the Minimum Solubility Parameter of the polymer. As will be shown below, the Minimum Solubility Parameter for the polymers to be used in the new compositions and process of this invention is about 6.85 (cal/cc)$^{\frac{1}{2}}$ or less. In other words, if a given polymer is soluble at the 10 weight percent level in a mixture of n-pentane and perfluorodimethylcyclohexane wherein said mixture has a solubility parameter of about 6.85 or less, then such polymer is an acceptable polymer for use in the compositions and process of this invention provided further that such polymer satisfies the other criteria set forth in this specification. By "about 6.85" is meant 85±0.02 since the determined value of the solubility parameter of the n-pentane-perfluorodimethylcylcohexane mixture might be off by a factor of ±0.02. By "soluble" is meant that the components form a one-phase solution. By "insoluble" is meant that a second phase is observed (i.e., a second liquid phase or a solid phase).

POLYMER

As stated in our application, U.S. Ser. No. 073,791, we discovered that we could achieve viscosity increases for carbon dioxide of three-fold to 30-fold or more using certain defined cosolvents along with certain defined polymers having a minimum solubility parameter of 6.85 (cal/cc)$^{\frac{1}{2}}$ or less and having electron donor groups, such as ether, silyl ether, and tertiary amine. Preferably, these polymers have a molecular weight of over 1000. Of the commercial polymers tested so far, only the siloxane and the vinyl(ethyl ether) polymers meet both criteria and both have high solubilities. The light polydecene meets the solubility parameter criterion but has no donor atom, thus its solubility in carbon dioxide is only 1.3 wt.%.

It is possible to modify polymers such that they will contain donor groups with high donor strength and will also meet the solubility parameter criterion. These donor groups are Lewis base sites which are able to interact with the weakly acidic carbon dioxide molecules. It is this donor-acceptor interaction which, in addition to the solubility parameter requirement, enables certain polymers to dissolve in carbon dioxide.

One method of polymer modification is to introduce silyl ether groups. Siloxy and silyl ether groups can be introduced into a polymer by polymerizing an olefin with vinyl trimethylsilyl ether monomer.

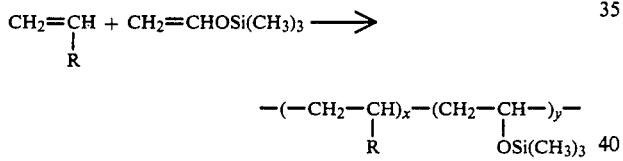

This will give a hydrocarbon polymer with pendant trimethylsiloxane groups which will be less expensive than the polydimethylsiloxanes. Alternatively, vinyl dimethylchlorosilane can be co-polymerized with an olefin monomer or grafted onto an existing functionalized polymer. By "functionalized polymer" we mean a polymer having side or pendant groups that allow the introduction of a silyl or siloxy group into the polymer.

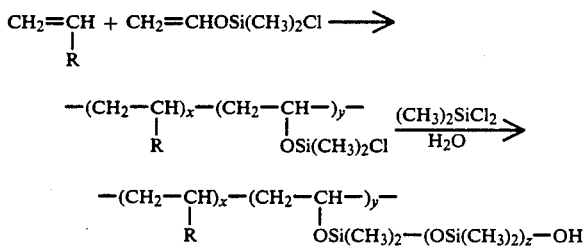

The pendant dimethylchlorosiloxane group is reactive In particular, the reaction with dimethyldichlorosilane in the presence of water will produce a pendant siloxane chain. It should be noted that dimethyldichlorosilane can be oligomerized with aqueous hydrochloric acid and then these oligomers can be reacted with the pendant silane group. Addition of an appropriate amount of hexamethyldisiloxane will control the siloxane chain growth. A variation of this scheme involves copolymerization or grafting using vinyl methyldichlorosilane. In this case, the pendant methyldichlorosilane group could be reacted with dimethyldichlorosilane to grow two siloxane chains from the pendant group.

There are a variety of ways the polymer can be formed by grafting a polydialkylsiloxane group onto a functionalized polymer. For instance the polymer can be formed by copolymerizing an olefinic monomer and a siloxy monomer, such as vinyl dialkylchlorosiloxane or vinyl alkyldichlorosiloxane, to make a first polymer and grafting polydialkylsiloxane groups onto the first polymer. Or, the polymer can formed by copolymerizing an olefinic monomer and a siloxy monomer, such as vinyl dialkylchlorosiloxane or vinyl alkyldichlorosiloxane, to make a first polymer and reacting that first polymer in the presence of a controlled amount of water with a silyl compound, such as dialkyldichlorosilane or cyclic polydialkylsiloxanes.

In another approach, the polymer can be formed by copolymerizing an olefinic monomer and a vinyl acetate monomer to form a first polymer, hydrolyzing that first polymer to make a second polymer consisting of an olefinvinyl alcohol copolymer, and grafting polydimethyl siloxane groups onto that second polymer. Alternatively, the second polymer can be reacted in the presence of a controlled amount of water with a silyl compound, such as dialkyldichlorosilane or cyclic polydialkylsiloxanes.

In still another approach, the polymer can be formed by grafting polydialkyl siloxane groups onto a polymer containing hydroxyl groups or hydroxyalkyl groups. Or the polymer can be formed by reacting a polymer containing hydroxyl or hydroxyalkyl groups with silyl compounds, such as dialkyldichlorosilane and cyclic polydialkylsiloxanes in the presence of a controlled amount of water.

COSOLVENT

Certain materials defined below can serve to dissolve the above-described polymers to form a carbon dioxide-polymer-cosolvent solution wherein the viscosity of the carbon dioxide is increased at least three-fold.

The cosolvent should be capable of forming a one-phase admixture with the selected polymer at ambient temperature and a pressure sufficient to maintain the cosolvent in the liquid phase when in the admixture the cosolvent equals 10% by weight of the polymer. By a "one-phase admixture," we mean that the cosolvent has dissolved into the polymer and a separate liquid phase is not observed. In addition, the cosolvent should be capable of being dissolved to at least the two weight percent level, preferably four weight percent level or above, into liquid carbon dioxide at 25° C. and 950 psig.

It is a simple matter for one having ordinary skill in the art to determine by a simple experiment (i) whether a given liquid cosolvent will form a one-phase admixture with a selected polymer at ambient temperature and a pressure sufficient to maintain the cosolvent in the liquid phase using a cosolvent polymer admixture wherein the cosolvent equals 10% by weight of the polymer, and (ii) whether the cosolvent will dissolved in carbon dioxide at 25° C. and 950 psig to at least the two weight percent level. If these two simple tests are met, then the selected cosolvent will be suitable for use with the selected polymer in the compositions and method of this invention.

As a class, it would appear that many materials, including the following materials, are suitable for use as cosolvents in this invention:

(a) alcohols having from 1 to 8 carbon atoms, such as methanol, ethanol, isopropyl alcohol, hexanol, cyclohexanol;

(b) aromatics having a single ring and from 6 to 10 carbon atoms, such as benzene, toluene, and the xylenes;

(c) ketones having from 3 to 10 carbon atoms, such as methylethylketone, dipropylketone, methyloctylketone, and acetone;

(d) carboxylic acid esters where the carboxylic acid portion has from 2 to 4 carbon atoms and the ester portion has from 1 to 10 carbon atoms, such as ethylacetate, ethylpropionate, hexylacetate; and (e) hydrocarbons having from 3 to 20 carbon atoms, such as propane, pentane, propylene, cyclohexane, isobutane, heptane, methylcyclohexane, octane, butylenes, 1-octene, or mixtures thereof including refinery streams such as naphthas, kerosene, gas oils, gasolines, etc. Preferably the hydrocarbons are aliphatic hydrocarbons having from 2 to 10 carbon atoms.

One technique for obtaining the desired cosolvent on-site is to contact the carbon dioxide in a liquid-liquid extraction apparatus with recovered crude or a fraction of such crude for a sufficient time to permit the carbon dioxide to extract enough light hydrocarbons to function as the cosolvent. The desired amount of polymer would then be added to the carbon dioxide-light hydrocarbon extract to form the oil-driving material.

AMOUNTS OF CARBON DIOXIDE, POLYMER, AND COSOLVENT

The new compositions of this invention comprise from 70 to 99.9 weight percent carbon dioxide (usually from 80 to 99 weight percent carbon dioxide, preferably 85 to 99 weight percent carbon dioxide) and a sufficient amount of a mixture of a polymer and a cosolvent, both as defined above, to effect at least a three-fold increase in the viscosity of the carbon dioxide Usually the weight percent polymer in the mixture is from 0.05 to 20 weight percent, more usually from 0.1 to 10 weight percent. The amount of cosolvent is at least sufficient to dissolve the desired amount of polymer in the carbon dioxide and is at least 40% by weight of the polymer employed. This amount of cosolvent is usually from 0.05 to 30 weight percent of the final mixture, more usually from 0.1 to 15 weight percent.

The weight ratio of the cosolvent to polymer in the new compositions of this invention can be from 0.4:1 to 600:1; preferably from 0.4:1 to 15:1; and more preferably from 0.5:1 to 1.5:1.

While the present invention has been described with reference to specific embodiments, this application is intended to cover those various changes and substitutions which may be made by those skilled in the art without departing from the spirit and scope of the appended claims.

What is claimed is:

1. In a method for recovering oil from an underground oil-bearing earth formation penetrated by an injection well and a producing well, in which method carbon dioxide is injected into said formation to displace oil towards said producing well from which oil is produced to the surface, the improvement comprising injecting into said formation carbon dioxide, the viscosity of which is increased at least three-fold by the presence of a sufficient amount of a polymer containing pendant groups selected from the group consisting of silyl ether groups and polydialkylsiloxane groups and a sufficient amount of a cosolvent to form a solution of said polymer in said carbon dioxide, wherein the minimum solubility parameter of said polymer is reduced to 6.85 $(cal/cc)^{\frac{1}{2}}$ or less by control of the number of pendant groups and by the selection of said pendant groups.

2. The method according to claim 1 wherein said cosolvent is such that (1) it can form a solution with carbon dioxide at 25° C. and 950 psig containing at least 2 weight percent of the cosolvent and (2) it can form a one-phase admixture with the polymer at about 25° C. and a pressure sufficient to maintain the cosolvent in the liquid phase and wherein the weight of cosolvent in said admixture is 10% by weight of the polymer.

3. The method according to claim 2 wherein the cosolvent is selected from one or more from the class consisting of alcohols having from 1 to 8 carbon atoms; single ring aromatics having from 6 to 10 carbon atoms; ketones having from 3 to 10 carbon atoms; carboxylic acid esters where the carboxylic acid portion has from 2 to 4 carbon atoms and the ester portion has from 1 to 10 carbon atoms; and hydrocarbons having from 2 to 20 carbon atoms.

4. The method according to claim 1 wherein the carbon dioxide solution comprises from 70 to 99.9 weight percent carbon dioxide; from 0.05 to 20 weight percent of the polymer; and from 0.05 to 30 weight percent of the cosolvent.

5. The method according to claim 4 wherein the amount of carbon dioxide is from 80 to 99 weight percent; from 0.1 to 10 weight percent of the polymer; and from 0.1 to 15 weight percent of the cosolvent; and wherein the weight ratio of cosolvent to polymer is at least 0.4:1.

6. The method according to claim 1 in which said viscous carbon dioxide solution is prepared by first forming a solution of said polymer and said cosolvent and then mixing carbon dioxide with said first solution 7. The method according to claim 6 in which the volume of said viscous carbon dioxide solution injected is from about 0.001 to about 2 formation pore volumes, and in which the injection of carbon dioxide occurs at a pressure above the minimum miscibility displacement pressure.

8. The method according to claim 7 wherein said viscous carbon dioxide is introduced into said formation at a pressure of at least 1,100 psi.

9. The method defined in claim 1 wherein said viscous carbon dioxide is displaced through said formation by a drive fluid which is comprised of slugs of said viscous carbon dioxide alternated with slugs of a fluid comprising water.

* * * * *